Figure 1:
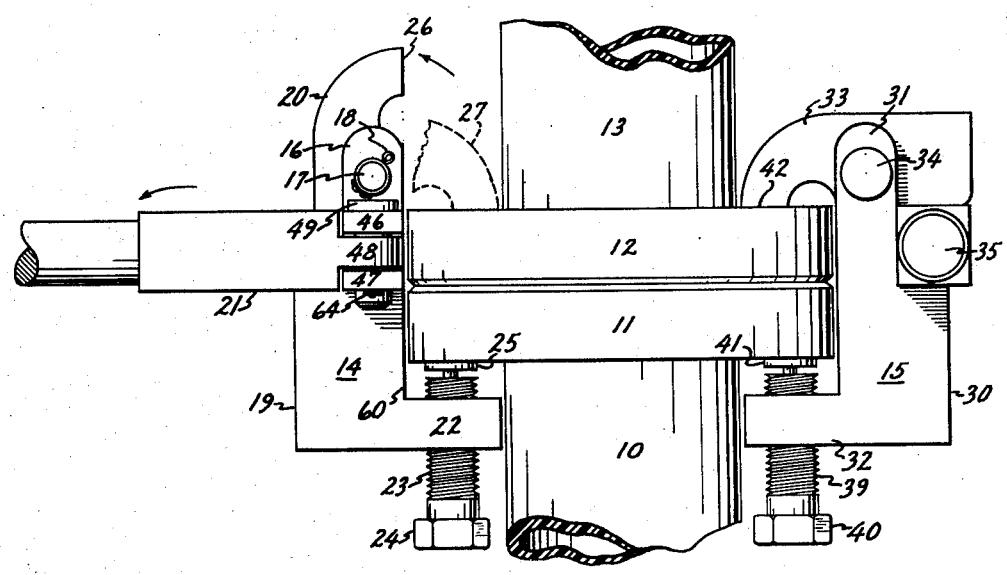

Dec. 15, 1959  A. L. HENDRIX  2,916,789
INSTANT RELEASING C-CLAMP
Filed April 21, 1958

INVENTOR
Alfred L. Hendrix
BY
George H. Baldwin
ATTORNEY

United States Patent Office 2,916,789
Patented Dec. 15, 1959

2,916,789

INSTANT RELEASING C-CLAMP

Alfred L. Hendrix, Beirut, Lebanon

Application April 21, 1958, Serial No. 729,676

2 Claims. (Cl. 24—243)

The present invention relates to instant releasing C-clamps and more particularly to a C-clamp adapted for clamping hose flanges.

The clamp to which this invention pertains is particularly adapted for the clamping of hose flanges, and specific objects of the invention include the provision of a simple clamp capable of exerting the high force necessary to so seal the flanges as to prevent leakage at the coupling, and capable of immediate intentional release in a manner to become completely disengaged from the flanges upon release of the clamp while being not subject to unintentional or inadvertent release under the conditions of use. The clamp of this invention comprises a threaded jaw which is readily tightenable by means of a wrench and an opposing jaw which, upon operation of handle means, will swing completely out of the way and permit the clamp to fall free of the flanges without danger of catching on or fouling the flanges.

A general object of the invention is to provide a C-clamp which is quickly and easily opened without the possibility of portions of the clamp becoming engaged with the clamped members.

A further object is to provide a clamp which is instantaneous and positive in release no matter how large and strong the expansive force of the clamped members.

A still further object is the provision of a releasable C-clamp which is sturdy and durable in construction, reliable and efficient in operation and relatively simple and inexpensive to manufacture and assemble.

In making temporary connection in high pressure hose lines, such as are used in loading and unloading oil in oil transporting vessels, or tankers, it is customary to employ hose lengths terminating at each end in a flange, and coupling between lengths is accomplished by clamping the flange of one length tightly against the appropriate flange of the next length. A similar coupling may be employed between an end of the hose and a flanged pipe on the vessel or on the dock. At the time when a coupling of the clamped flange type is to be broken, to disconnect the joined hose lengths, there is often considerable pull on the connection. One length of hose may, for example, be hanging from the other. When such couplings are joined by the usual type of C-clamps, loosening of the threaded jaws of the clamps requires substantial time and effort, particularly since the flanges separate as the clamp jaws are unscrewed, and even when the flanges have separated, it is often necessary to hammer away the clamps before the coupling will completely part.

My improved clamp prevents the catching of the clamped material on the arms of the clamp by providing a pivoted clamping member which moves back completely out of the path of the clamped material, and the release is attainable substantially immediately by the simple swinging of a lever element of the clamp.

Figure 2:
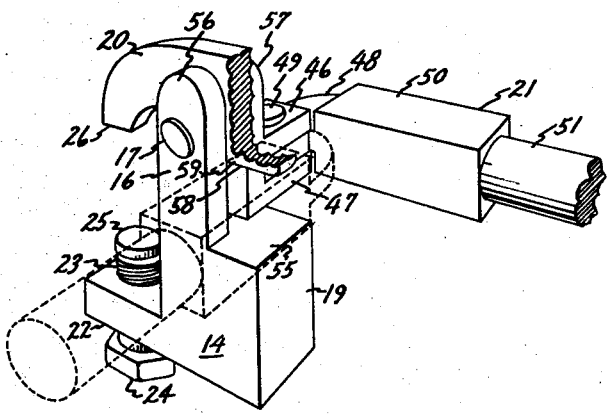

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which:

Fig. 1 is a perspective view of two clamps in accord with my invention applied to the flanges of a pipe connection with one clamp in the locked position and the other in the opened position; and Fig. 2 is a perspective view of the clamp, with a portion thereof cut away, showing the releasing means in the open position and with the closed position thereof indicated in broken lines.

Referring to Fig. 1, hose 10 is shown as having a flange 11 pressed against and thus connected to flange 12 of hose 13. An instant releasing C-clamp 14 in accord with the invention is shown on one side of the flanges and identical C-clamp 15 is shown on the opposite side. Three C-clamps may be used in completing the connection or, depending upon the rigidity required in the connection, two or four or more clamps may be desired.

C-clamp 14 comprises an L-shaped body 19 with an arm 20 disposed at the top of the longer leg 16 of the body and attached thereto by means of pivot pin 17, cotter pin 18 being placed through the pin to hold it in place in leg 16. Pivotable arm 20 is shown in an upright open position in Fig. 1, while in closed position, it is pivoted to the position shown in broken lines at 27 and, by means of locking lever 21, arm 20 may be locked in closed position to form a stationary leg or jaw for abutment against flange 12. Operation of locking lever 21 will be more fully explained below.

Carried on the shorter leg 22 of L-shaped body 19 is a pressure exerting threaded jaw member 23. By turning the hexagonal head 24 of threaded element 23, the end 25 exerts pressure on flange 11 thereby providing a tight connection between flanges 11 and 12.

C-clamp 15, disposed on the opposite side of the pipe connection is shown as comprising L-shaped body member 30 formed by longer arm 31 and shorter arm 32. At the top of arm 31, arm 33 is pivotally connected by means of pivot pin 34. Pivotal arm 33 is shown here in the closed position and held there by means of locking lever 35.

Arm 32 of body member 30 has threaded jaw element 39 extending therethrough. Turning of element 39 by means of its head 40 in the direction to cause end 41 to move toward flange 11 provides desired pressure to clamp the flanges together between end 41 and end portion 42 of arm 33.

Referring again to clamp 14, as seen in Fig. 1, when locking lever 21 is in the outwardly extended or open position shown pivotable arm 20 is free to pivot around pin 17 so that lip 26 is not only not in contact with flange 12 but is completely out of the way, with arm 20 approximately aligned with the longer arm 16 of L-shaped member 19. By moving back this distance, lip 26 will not come into contact with and cannot catch on either of flanges 12 and 11 and the clamp falls freely away from the pipe connection.

When clamps 14 and 15 of Fig. 1 are released, there may be a sudden separation of the flanges due to the strain imposed on the joint, and, as flange 12 moves away from flange 11, the path of movement is not obstructed by lips 26 and 42 since they are now disposed in the plane of the longer arms of the respective L-shaped members. By one movement of locking member 21 all elements of the clamp 14 are removed from possible obstruction of the separation of flanges 12 and 11.

Fig. 2 shows in greater detail the operation of locking lever 21. L-shaped member 19 is shown as having extending laterally from one side thereof two ears 46 and 47 spaced apart to provide for insertion therebetween of a lip portion 48 of locking lever 21. Pivot pin 49 extends through ear 46, lip 48 and ear 47 so that locking lever 21 may be pivoted in a plane perpendicular to the longitudinal dimension of L-shaped member 19. Locking lever 21 is shown as having a substantially square base portion 50 with a rounded handle portion 51 extending therefrom to provide a convenient hand hold for operating the locking and releasing lever 21.

Leg 16 of L-shaped arm 19 is provided with a rearwardly extending ledge 55, and locking lever 21 is pivoted into overlying engagement with this ledge when in the closed position.

Leg 16 is further provided with a bifurcated portion at the top thereof to form two ears 56 and 57 spaced apart to provide for insertion of pivotable arm 20 therebetween. Pivot pin 17 extends through ear 56, pivotable arm 20, and ear 57 to permit arm 20 to be moved into and out of contact position with the clamped material. Pivotable arm 20 is provided with a rearward heel portion 59 extending from pin 17 in a direction opposite to lip portion 26, the heel portion having a bottom surface 58 arranged to engage against square base portion 50 of locking lever 21 when the clamp is in a closed clamping position.

When locking lever 21 is in the position shown in solid lines in Fig. 2, arm 20 is free to pivot on pin 17 into upright open position with heel portion 59 of the arm entering between ears 56 and 57. This causes lip 26 of arm 20 to be moved to a position in alignment with the longitudinal dimension of arm 16.

To lock the clamp, pivotable arm 20 is rotated around pivot pin 17 so that lip 26 comes in contact with the clamped material. Locking lever 21 is then swung on pivot 49 to a position in which the square portion 50 fits in between the bottom surface 58 of arm 20 and the ledge 55 of leg 16. With the lever 21 in this position movement of pivotable arm 20 is prevented. Pressure of the clamp on the clamped flanges is applied by turning head 24 of threaded element 23 to move end 25 against the flanges.

In operation, two or three or more clamps are placed in position on the hose or pipe flanges 11 and 12, each with its locking lever and pivotal arm in the closed position, such as shown for clamp 15 in Fig. 1, and as indicated in full lines for arm 20 and broken lines for lever 21 in Fig. 2. When properly positioned, the screw of each clamp is tightened. The locking levers of the clamps are disposed generally tangentially of the flanges, and inward force on the levers will not cause opening of the clamps. When it is desired to release the coupling, the locking lever of each clamp is swung outwardly away from the flanges, into the position shown in Fig. 1 for lever 21. As the lever swings out from under the heel 59 of member 20, member 20 swings into alignment with the body 19 of the clamp, as seen at the left of Fig. 1, whereby the clamp is completely free to fall away from the flanges. When clamp 15 is similarly opened, it, too, falls away without danger of flange 12, for example, catching on any part of the clamp as the flanges separate.

It will be seen, accordingly, that the clamp includes body 19 including shank portion 16 having an integral arm 22 at one end and with a swingable jaw element 20 at its other end, with heel portion 59 spaced from rearward shoulder projection 55 when the clamp is closed, and that to retain the clamp closed, blocking portion 50 of lever or block member 21 is swung into engagement between the heel portion and the shoulder which underlies and is spaced from the heel portion.

While I have shown only a preferred embodiment of my invention by way of illustration, many modifications will occur to those skilled in the art, and I therefore wish to have it understood that I intend, in the appended claims, to cover all such modifications as fall within the true spirit and scope of my invention.

What I claim as new and desire to secure by Letters Patent of the United States is:

1. In a C-clamp, a body member of generally L shape including an elongated shank portion having a front side and a rear side and an integral arm extending forwardly from the front side of said shank portion at one end of the shank portion, a threaded element carried by said arm, a swingable jaw element having a clamping end portion and a heel portion, pivot means pivotally mounting said swingable jaw element between said portions thereof to the other end of said shank portion, said swingable jaw element being swingable from a closed position in which said clamping end portion extends forwardly from said shank portion and is disposed in operative confronting relation to said threaded jaw element and said heel portion extends rearwardly from the back side of said shank portion, into an open position in which said clamping end portion extends in substantial alignment with said shank portion in a direction away from said one end of the shank portion and said heel portion extends in a direction toward said one end of the shank portion, a projection integral with said shank portion extending rearwardly from the back side thereof forming a shoulder underlying and spaced from said heel portion when said swingable jaw element is in said closed position, and a block member swingably carried by said body member having a blocking portion engaged when said clamp is closed between said heel portion and said shoulder to retain said swingable jaw element in its said closed position, said block member being selectively swingable out of the path of swing of said heel portion thereby to release said swingable jaw element for swinging into its said open position.

2. An instant releasing C-clamp comprising an L-shaped body including a shank portion having opposite end portions and a clamping leg portion fixed to and extending laterally in a predetermined direction from one of said end portions, an elongated clamping arm, means pivotally connecting said clamping arm between its ends to the other end portion of said shank portion, said clamping arm having a clamping portion extending from said shank portion in said direction and spaced from and confronting said clamping leg portion and a heel portion extending from said shank portion in a direction opposite from the said direction when said clamping arm is in a closed position, said clamping arm being swingable on said means in a direction to swing said clamping portion of said arm member outwardly away from said clamping leg portion into substantial alignment with said shank portion and to swing said heel portion inwardly toward said shank portion, thereby to assume an open position, and a lever pivoted to said shank portion, said lever being swingable into a locking position in engagement with said heel portion and inwardly thereof to lock said clamping arm in its said closed position and swingable away from said heel portion to release said clamping arm for swinging into said open position.

References Cited in the file of this patent

UNITED STATES PATENTS 2,333,071    Jannisse et al.            Oct. 26, 1943

FOREIGN PATENTS 163,777    Australia               July 1, 1955
177,096    Great Britain          Mar. 23, 1922